United States Patent
Pomerantz

(10) Patent No.: US 7,913,004 B2
(45) Date of Patent: Mar. 22, 2011

(54) PORTABLE SELECTIVE MEMORY DATA EXCHANGE DEVICE

(75) Inventor: Itzhak Pomerantz, Kfar Saba (IL)

(73) Assignee: Sandisk IL Ltd, Kfar Saba (IL)

( * ) Notice: Subject to any disclaimer, the term of this patent is extended or adjusted under 35 U.S.C. 154(b) by 287 days.

(21) Appl. No.: 11/503,146

(22) Filed: Aug. 14, 2006

(65) Prior Publication Data

US 2007/0065119 A1    Mar. 22, 2007

Related U.S. Application Data

(60) Provisional application No. 60/714,215, filed on Sep. 6, 2005.

(51) Int. Cl.
  *G06F 13/12* (2006.01)
  *G11B 15/18* (2006.01)
(52) U.S. Cl. .......................... 710/74; 360/69
(58) Field of Classification Search ............ 710/74; 360/69

See application file for complete search history.

(56) References Cited

U.S. PATENT DOCUMENTS

| 6,993,618 B2 * | 1/2006 | Chen et al. ............ 710/305 |
| 2002/0054224 A1 * | 5/2002 | Wasula et al. ......... 348/232 |
| 2003/0163622 A1 | 8/2003 | Moran |

* cited by examiner

*Primary Examiner* — Henry W Tsai
*Assistant Examiner* — Juanito C Borromeo
(74) *Attorney, Agent, or Firm* — Davis Wright Tremaine LLP

(57) ABSTRACT

A portable data exchange device including a storage memory for storing data, a USB interface, and a device controller having a file-selection-and-transfer mechanism is disclosed. Upon coupling of the presently disclosed data exchange device with a USB flash drive (UFD), the file-selection-and-transfer mechanism is operative to automatically select for transfer a set of files residing in the data exchange device and/or the UFD, and to effect an inter-device file transfer between the data exchange device and the UFD of only the selected files. In exemplary embodiments, the data exchange device has at most a minimal user interface, no video display, and only one or two data ports. Optionally, the presently disclosed data exchange device automatically modifies names of files copied from the USB flash drive to the data exchange device in accordance with an identity of the source USB flash drive.

21 Claims, 6 Drawing Sheets

PORTABLE SELECTIVE MEMORY DATA EXCHANGE DEVICE

CROSS-REFERENCE TO RELATED APPLICATIONS

This patent application claims the benefit of U.S. Provisional Patent Application No. 60/714,215, filed Sep. 6, 2005 by the present inventors.

FIELD OF THE INVENTION

The present invention relates to a portable data storage device operative to effect data transfer of selected files with a USB flash drive.

BACKGROUND

USB Flash Drives (UFD) provide a convenient medium for the storage of user files and for the transfer of these files between different computers. One salient feature of UFD devices is their ability to exchange data with microcomputers and laptops having ports which support the standardized USB interface.

There is a need to transfer information from one UFD to another, similar UFD without the presence of a computer. Towards this end, a number of portable data exchange devices (DED) for copying information from one UFD to another are available for purchase, such as:

1. "USB Bridge" available from Delkin DEDs through PROVANTAGE Corporation, North Canton, Ohio, USA. Using this device, a user may transfer data from one USB flash drive to another without the use of a computer, by plugging both UFDs into two female sockets.

2. FlashPoint ShareDrive available from Xmultiple Technologies, Simi Valley, Calif., USA, that has a female connector into which the user can plug two UFDs sequentially. In this way, the user may transfer data from a source UFD to a target UFD by first copying the data from the source UFD into the DED, and then copying the data from the DED to the target UFD.

Both of the aforementioned products, while useful for copying the full content of a UFD into another UFD, do not address the problem of selectivity, which is very typical for a user who carries stored personal data. In particular, there are many situations where the user wants to transfer only some information on the UFD instead of copying the full content.

US Patent Application 2003/163622 (in particular, FIG. 2 of that document) discloses a non-volatile memory device which is operative to exchange one or more files and/or data sets requested by the user with another similar non-volatile memory device.

SUMMARY

Some or all of the aforementioned needs, and other needs, may be satisfied by several aspects of the present invention.

The present invention provides a portable data exchange device (DED) with a simplified device interface that is configured to effect a transfer of selected files with a standard USB flash drive (UFD). The presently disclosed device is configured such that no special hardware, software or firmware are required within the UFD in order to carry out the aforementioned transfer of only selected files with the UFD. Thus, the presently disclosed device is extremely useful for transferring selected files between different UFDs without the need for a PC or a laptop.

It is now disclosed for the first time a portable data exchange device (DED) for effecting data transfer operations. The presently-disclosed DED includes (a) a memory for storing data; (b) a single data transfer port; and (c) a device controller having a file-selection-and-transfer mechanism, wherein, (I) the file-selection-and-transfer mechanism is operative, upon coupling through the port with a UFD which lacks the file-selection-and-transfer mechanism; (i) to automatically select for transfer a set of files residing in one of the memory and the UFD; (ii) to effect an inter-device file transfer through the data transfer port with the UFD of only the automatically selected files; and (II) the portable data exchange device lacks a video display.

According to some embodiments, the presently disclosed DED lacks user controls.

According to some embodiments, the portable DED further includes (d) a user control that is operative only to effect file operations (including but not limited to actions such as copying and/or moving one or more files from the UFD to the host device, copying and/or moving one or more files from the UFD to the host device, deleting one or more files from the DED and/or UFD, and verifying a file transfer), and the device lacks additional user controls (i.e., operative to effect tasks other than file operations).

According to some embodiments, the device has only a single key (i.e. and no other user controls) operative to effect the at least one file operation.

According to some embodiments, the portable DED user control is operative to erase at least some files (for example, at least a majority, at least 90% of all files, or all files) residing in the memory upon a single user engagement.

According to some embodiments, the data transfer port is a female USB port.

According to some embodiments, the file-selection-and-transfer mechanism is operative to perform the automatic selecting of the files in accordance with at least one of a file name, a file location (for example, which folder a file is located in), an identifier of the USB flash drive currently coupled with the data exchange device, and a file time stamp (for example, when the file was created or last used).

According to some embodiments, the controller is further operative to automatically modify at least one file attribute of a file (for example, a file name, a file time stamp, or an identifier of a file owner) transferred from the USB flash drive to the memory.

In some embodiments, the controller is operative to modify the file attribute in accordance with an identifier (for example, a serial number) of the USB flash drive from which the files are copied.

According to some embodiments, the controller supports a read mode and a write mode.

According to some embodiments, the controller is operative to automatically effect a transition between the modes after a given uncoupled time period (for example, a given amount of time that the DED is not connected with any USB flash drive, or when a particular port of the DED is not connected with any USB flash drive), which equals or exceeds a pre-determined value.

According to some embodiments, the controller is configured such that upon coupling with the UFD, the portable DED adopts either the read mode or the write mode in accordance with an identifier of the UFD.

According to some embodiments, the controller is operative to effect a transition between the modes upon detecting a user engagement with a user control.

According to some embodiments, the controller is operative to automatically erase data (for example, one or more files, or a majority of files, or substantially all files) residing in the memory after the uncoupled time period.

The present invention also provides systems for data transfer including the aforementioned DED and the USB flash drive device.

It is now disclosed for the first time a method for transferring files. The presently disclosed method includes (a) using a display-less data exchange device, detecting a coupling between the DED and a first USB flash drive through a USB interface of the DED, (b) upon coupling, automatically selecting for transfer a set of files residing in one of the data exchange device and the first USB flash drive; and (c) effecting an inter-device file transfer through the USB interface with the first USB flash drive of only the automatically selected files, wherein steps (b) and (c) are carried out in a manner that is insensitive to any user commands received through a user control of the data exchange device during a time of the coupling.

It is noted that "carried out in a manner that is insensitive to any user commands" also includes the situation where no user commands are received into the data exchange device, and the situation where the data exchange device lacks any user controls.

According to some embodiments, the data exchange device has only a single data port (i.e., the USB port for data transfer with the USB flash drive), and lacks other data ports for data transfer.

According to some embodiments, the inter-device file transfer includes copying only the automatically selected files from the first USB flash drive to the data exchange device, and the method further includes (d) after the copying to the data exchange device, establishing a write mode within the data exchange device.

According to some embodiments, the inter-device file transfer includes copying only the automatically selected files from the first USB flash drive to the data exchange device, and the method further includes (d) upon detecting a coupling of a different USB flash drive other than the first USB flash drive, copying at least some the previously copied files to the different USB flash drive.

According to some embodiments, the method further includes (d) without any user intervention, automatically modifying names of files copied from the first USB flash drive in accordance with an identity of the first USB flash drive.

According to some embodiments, the inter-device file transfer includes copying only the automatically selected files from the first USB flash drive to the data exchange device, and the method further includes (d) after the copying, after a pre-determined uncoupled time period, automatically erasing the copied files.

It is now disclosed for the first time an inter-UFD user-selectable file copying device, where the copying device lacks control keys.

It is now disclosed for the first time an inter-UFD user-selectable file copying device, where the copying device lacks a video display.

It is now disclosed for the first time an inter-UFD user-selectable file copying device comprising a device controller, said device controller operative to automatically establish one of one read and write modes.

These and further embodiments will be apparent from the detailed description and examples that follow.

BRIEF DESCRIPTION OF THE DRAWINGS

FIG. 5 provides an exemplary operating routine for the DED in accordance with exemplary embodiments of the present invention.

DETAILED DESCRIPTION

The present invention will now be described in terms of specific, example embodiments. It is to be understood that the invention is not limited to the example embodiments disclosed. It should also be understood that not every feature of the presently disclosed data storage device and method of transfer files between a USB flash drive (UFD) and a data storage device is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first.

Figure 1A:
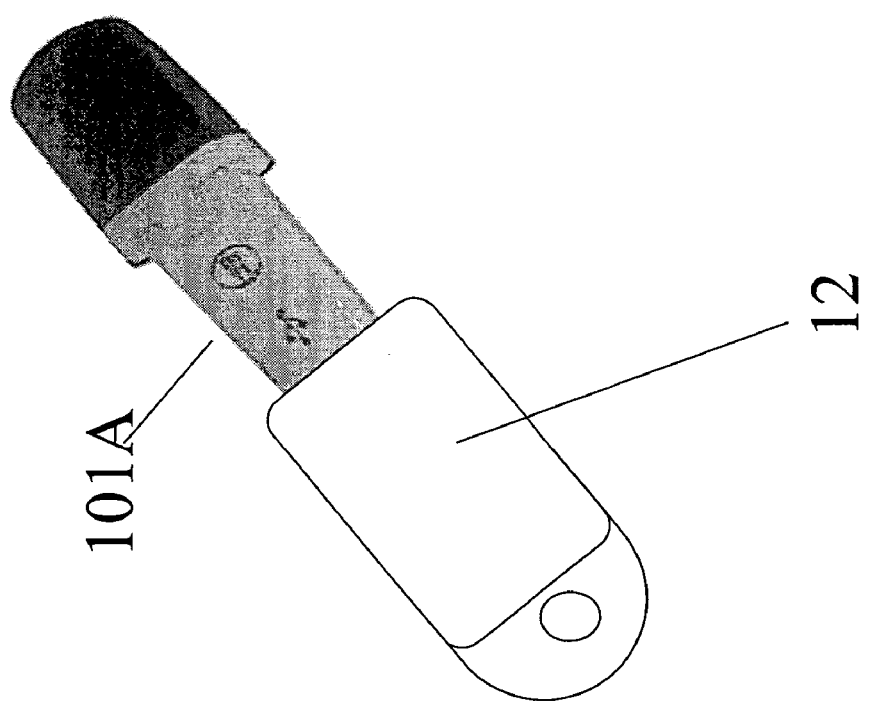
FIGS. 1A-1B illustrate the copying of files between two different UFDs according to exemplary embodiments.
Figure 1B:
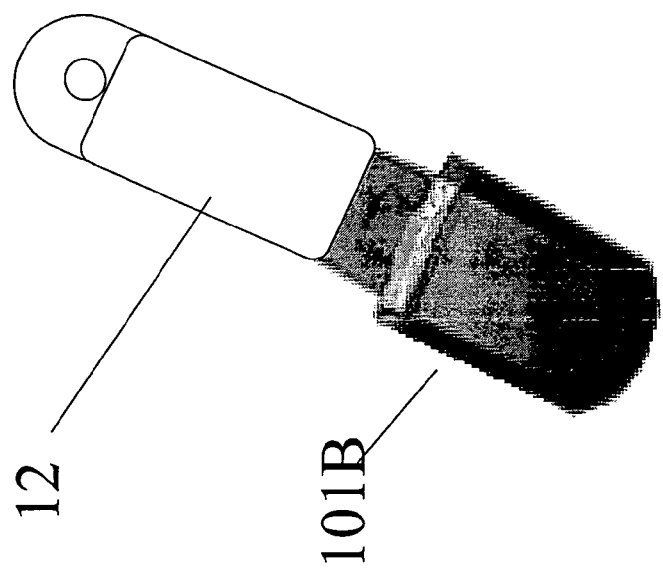

FIGS. 1A-1B provide an illustration of copying files between two different UFDs (10A and 10B) using an exemplary data exchange device (DED) 12. In particular, according to the exemplary use scenario of FIG. 1A, the first UFD (i.e., the "source" UFD) is inserted into a socket or data transfer port of the DED (typically a female USB port). Upon insertion or "coupling" of the UFD 101A with the data exchange device, one or more data files are automatically transferred, without requiring any command from the user (for example, received from an input of the DED, for example after the DED is coupled to the UFD) (or without any user intervention, for example, after the DED is coupled to the UFD), from the source UFD 101A to the DED 12. After the source UFD 101A is removed from the female USB socket, a different UFD 101B distinct from the source UFD is inserted into the USB socket of the DED 12. According to this exemplary use scenario, after this second UFD 101B is coupled with the DED 12, the DED automatically, without any command from the user, copies the files to the second UFD 101B.

One non-limiting example of a UFD is the DiskOnKey® device available from M-Systems (Newark, Calif.).

Both copying files from the UFD 101A to the DED 12 and copying files from the DED 12 to the UFD 102B are defined as effecting "file transfer." As used herein, a file transfer refers to copying files from a source device (i.e., a DED in write mode or a UFD when the DED is in read mode) to a destination device (i.e., copies of the files reside on both devices after the file transfer) as well as moving files from the source device to the destination device (i.e., a copy of the files resides on the destination device after the file transfer and no copy of the files resides on the source device).

As used herein, a "source" UFD 101 is a UFD from which files are transferred (i.e., copied and/or moved) to the DED. A "destination" UFD 101 is a UFD to which files are transferred (i.e., copied and/or moved) from the DED 12. In some examples, a single UFD may be both a "source UFD" as well as a "destination UFD" if, after coupling with the DED, both a file transfer from the UFD 101 to the DED 12 and a file transfer from the DED 12 to the UFD 101 are effected.

There are many applications of the presently disclosed DED device. In one example, it is possible to copy and/or move selected files from a given source UFD to the DED, and then to copy these files into a plurality of destination UFDs, which are coupled with the DED one by one. In this example and other examples, it may convenient for the device to have minimal or no user interface, and no display, in order to provide a streamlined user experience.

Figure 2:
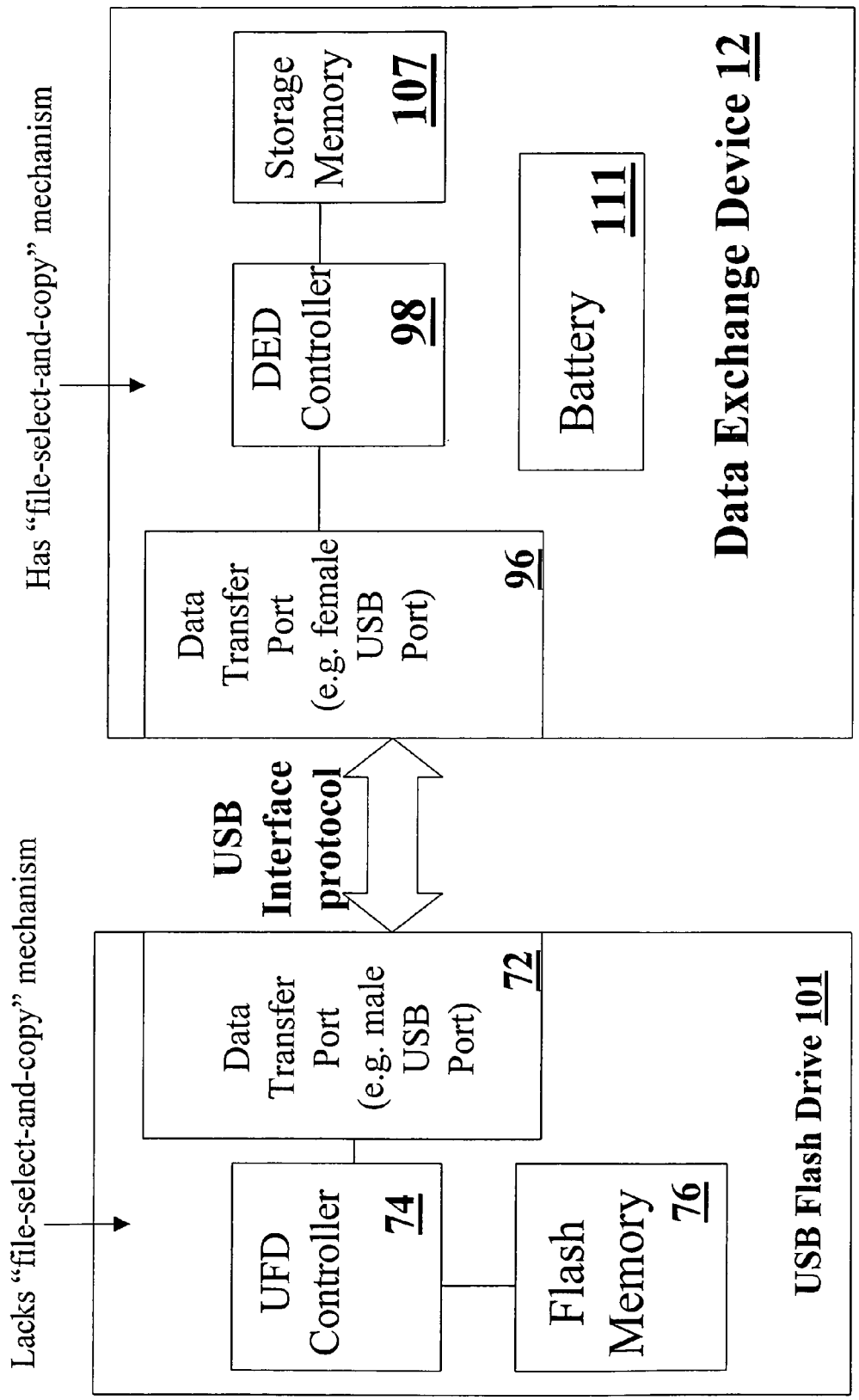
FIG. 2 provides a block diagram of an exemplary DED.

FIG. 2 provides a block diagram of a system including an exemplary DED 12 coupled with a UFD 101. The DED 12 includes a data transfer port 96 (in one non-limiting example a female USB port), a DED controller 98, and storage memory 107. The storage memory 107 (for storing files copied from the UFD 101) may include any combination of volatile and/or non-volatile (for example, flash) memory. Typically, the DED controller 98 is operative to control write operations (i.e., writing data received through the port 96 into the storage memory 107) and read operations (i.e., handling read requests received through the port 96 by fetching data from the storage memory 107). The DED controller 98 is operative to present a standard interface (typically, a USB interface) through the data transfer port 96 to the USB device 101. The DED controller is further operative to provide file management functionality, and in particular a file-selection-and-transfer mechanism, which will be explained below. The DED controller may be implemented as any combination of hardware, software and firmware. In exemplary embodiments, the device also typically includes some sort of optional power source 111.

The UFD device 101 also includes a data transfer port 72 (in one non-limiting example, a male USB port), a device controller 74 and a flash memory 76.

The DED 12 may be connected with the UFD 101 (i.e., via ports 96 and 72) either directly or via a USB cable (not shown). The electrical interfaces associated with ports 96 and 72 comply with the USB physical interface specifications.

The DED controller includes a file-selection-and-transfer-mechanism which is operative to automatically select one or more files in the data exchange device 12 (i.e., in the storage memory 107) or in the UFD 101, and to effect an inter-device file transfer (i.e., between two separate devices—the DED 12 and the UFD 101—from the DED to the UFD and/or from the UFD to the DED).

The file-selection-and-transfer-mechanism of the DED controller 98 may be implemented in any combination of hardware, software and firmware. Furthermore, the aforementioned hardware, software and firmware of the file-selection-and-transfer-mechanism reside within the data exchange device 12. There is no need for a file-selection-and-transfer-mechanism to reside within the UFD 101 (and particularly, within the UFD controller 74). Thus, the aforementioned the DED 12 may provide the file-selection-and-transfer functionality with "ordinary" UFD 101 devices lacking the file-selection-and-transfer mechanism.

Figure 3:
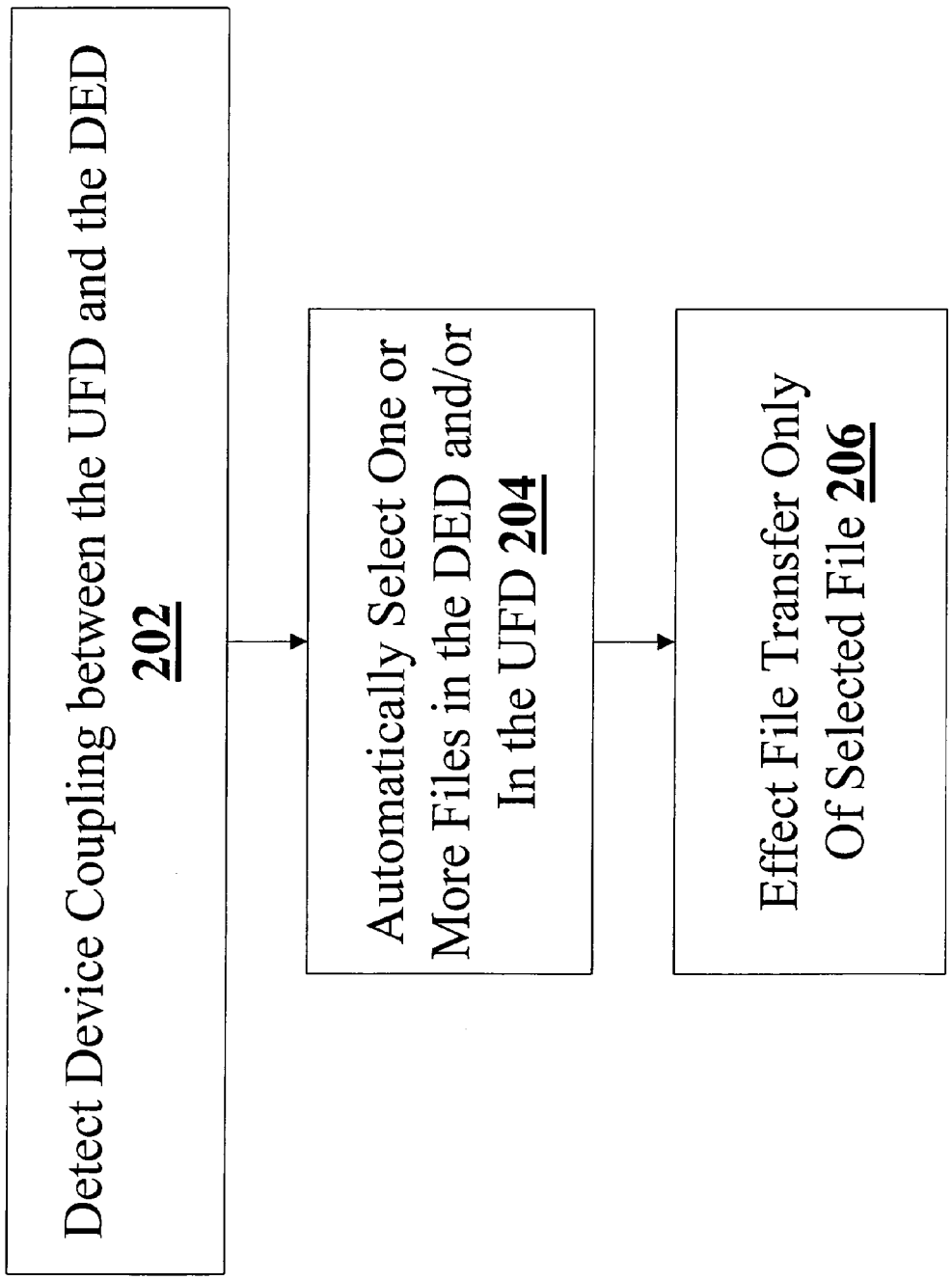
FIGS. 3 and 5 provide block diagrams of exemplary routines for operating a DED.

FIG. 3 provides a flow chart of an exemplary file selection and transfer routine provided by the file-selection-and-transfer mechanism of the DED controller 98 residing within the DED 12. When device coupling 202 between the UFD 101 and the DED 12 is detected 202 (for example, by controller 98), one or more files are automatically selected 204 (without any need for any command from the user) and transferred (i.e., copied and/or moved) between devices (i.e., from the UFD 101 to the DED 12 in read mode or from the DED 12 to the UFD 101 in write mode).

As the aforementioned file selection and transfer process is automated by the file-selection-and-transfer mechanism, there is little or no need for user intervention other than "plugging in" the male USB port 72 of the UFD 101 into the female USB port 96 of the DED 12 (or alternatively, connecting the UFD and the DED with a cable). As such, in order to provide a simplified user experience, the DED 12 may have one or more (optionally all features, but not necessarily all features) of the following salient features:

a) the DED 12 has no video display;
b) there is no functionality within the DED 12 for rendering video content, i.e., the DED 12 lacks a video rendering mechanism;
c) the DED 12 has no video port through which a video display may receive video content from the DED 12;
e) the DED 12 has no data port (for example, the DED has no video port) other than the single female USB port 96,
f) the DED 12 lacks an operating system;
g) the device lacks user controllers;
h) the device has only a limited set of user controllers, for example, one user button or dial, or at most three user buttons or dials, but lacks support for a user keyboard (i.e., numerical and/or alpha-numerical);
i) all control circuitry (for example, all processing units) within the DED are configured for functionality related to data storage in the memory 107 and there are no "general purpose" CPUs as in a personal computer or PDA.
j) the device has only one data exchange port, which is the sole interface for data exchange between the data exchange device 12 and any other device;
h) the device has no ability to receive additional application software;
i) the device is configured to operate as a stand-alone device when exchanging data with the UFD;

As used herein, a "display-less" data exchange device lacks a video display (although it may optionally have one or more LEDs or other non-video visual status indicators, and it may optionally lack these other non-video visual status indicators.) The "display-less" device may also optionally have an audio indicator for indicating file operations such as a buzzer. It also lacks a video port operative when the DED is coupled to the UFD, and typically lacks a video card or any other electronic circuitry configured to render video.

File Selection Mechanism

A discussion of exemplary file selection routines will now be provided. In exemplary embodiments, files may be selected (for transfer from the UFD 101 to the DED 12 or from the DED 12 to the UFD 101) in accordance with one or more of the following criteria (file attributes):

a) file name—for example, only selecting for transfer files whose names match a pattern;
b) file type/extension—in one example, users will have "office" files such as .doc, .xls, .ppt files on the UFD as well as "personal" files (such as music files or movie files). According to this example, movie files and music files are not selected for file transfer. According to another example, only files with specific extensions (such as Microsoft Office files) are selected for transfer.
c) file size—in one non-limiting example, only files smaller than a certain size are copied.
d) file status—in one example, "hidden" files are not selected for file transfer. In another example, files whose "last modified status" is older than a certain time, or younger than a certain time, are or are not selected for file transfer. In another example, files are selected in accordance with a "file creation time/date status."
e) file location within the directory—in one example, files are only transferred from a source UFD to the DED if they are located in a specific location—for example, a specific/directory with a pre-determined name, such as "pipette." In another example, files in a specific pre-determined location are not copied.

It is noted that when files reside in the DED, they are either transferred (copied and/or moved) to a connected UFD or not transferred to the connected UFD. For any given file in the DED, a decision whether or not to copy and/or move the file to a given UFD may be made (i.e., without receiving a user command in the DED after the UFD is connected to the UFD) in accordance with one or more of a number of factors, including but not limited to:

a) whether or not the file already exists on the UFD. In some embodiments, the DED is configured for "no over-write" of files on the UFD. Alternatively, the DED is configured to over-write "older" versions of the file but not newer versions of the file. In another example, if a file exists on both the DED and the UFD, the file will automatically be re-named (without any need to receive a user command through a control of the DED) and copied and/or moved to the UFD.

Automatic Modification of Copied Files and/or Metadata of Copied Files

In some embodiments, when copying one or more files from the UFD 101 to the DED 12, the DED 12 (for example, the controller 98) is operative to automatically modify some aspect of the copied file, for example, the name of the copied file, the extension of the copied file, or the contents of the copied file. This modification can be in accordance with any number of factors, including a current date/time, an identifier of a "source" UFD 101 from which files are copied, and so on. In one example, the file name is modified to include any number of digits (for example, three digits) of the source UFD. This will enable a user of a copied file (for example, a user of the "destination" UFD) to recognize from where the file was received.

In another example, the content of the actual file may be modified in accordance with the source UFD (for example, by inserting a Microsoft Word comment).

Thus, in exemplary embodiments, the controller 98 of the DED is operative to read and optionally store in memory 107 the UDF ID number of the coupled UFD.

Figure 4:
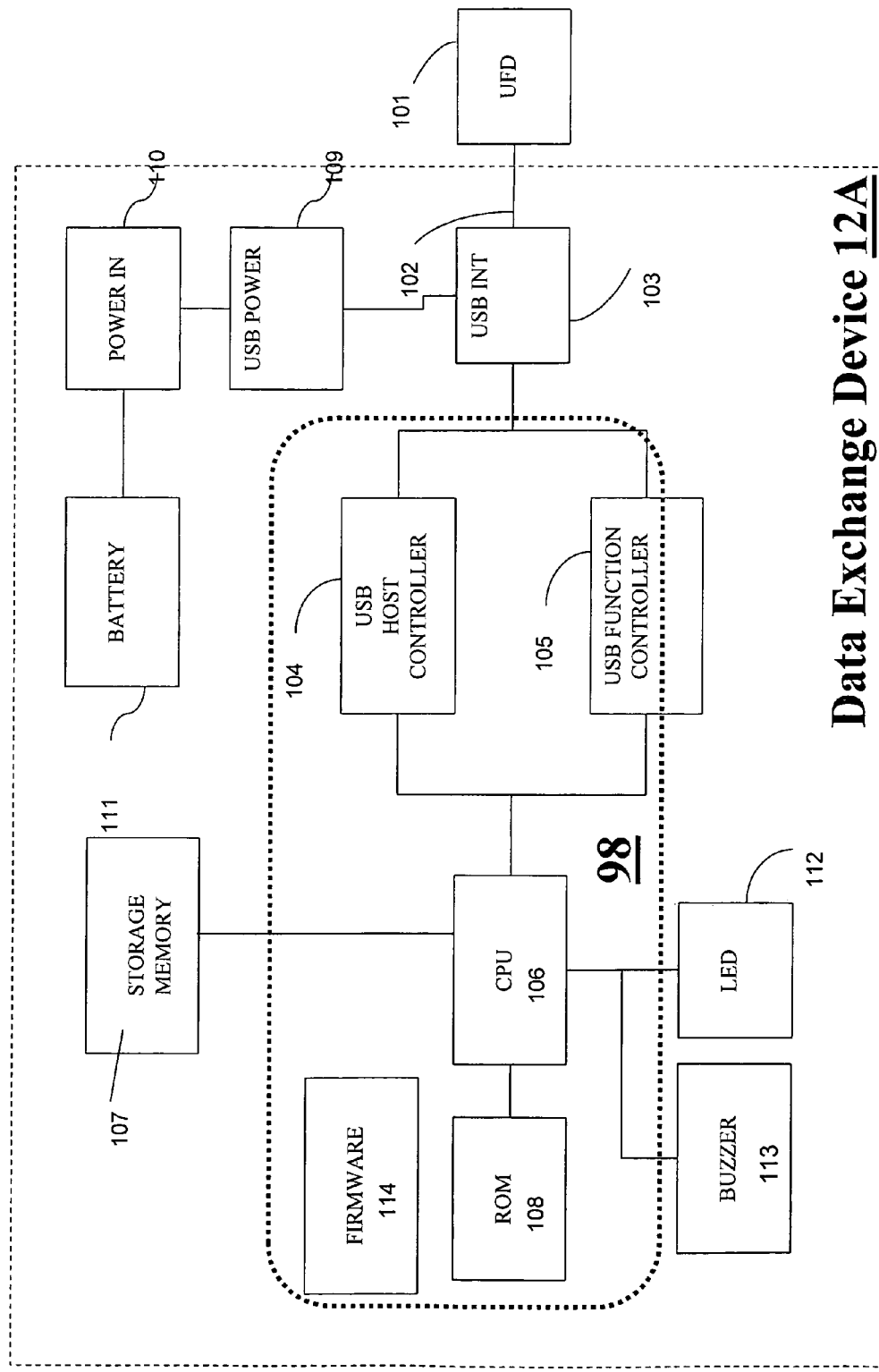
FIG. 4 provides a block diagram of an exemplary DED.

Non-Limiting Exemplary Implementation of a DED 12 as Described in FIG. 4

As stated earlier, any combination of software, hardware and firmware may be provided in the DED controller 98 so that the DED 12 provides the file-selection-and-transfer functionality, and so that the DED 12 provides both read and write modes. In some exemplary non-limiting embodiments (see FIG. 4), the DED controller 98 includes both a USB host controller 104 and a USB function controller 105. Devices comprising both USB host and USB function are well known in the industry and are also defined under USB OnTheGo specifications by the USB Implementers Forum. Such devices are used for extending peripheral capability, such as a smart printer connected to a PC host via USB interface, and for acting as a USB device (slave) controlled by a PC operating system and application software (e.g., for printing Word documents). The same printer can switch roles and become a USB host (master) when connected to a USB camera device function, hence controlling the USB camera for the purpose of reading image files stored in the USB camera and printing them without the need for PC intervention. There are also other known products that combine a USB functional interface for connecting to a PC host with a USB host controller to connect to a USB storage device, typically for retrieving data or system files; for example, a portable USB barcode scanner capable of updating its internal firmware by connecting to a USB device holding the firmware in the form of a binary file.

Thus, in some embodiments, the presently disclosed DED 12 makes novel use of USB host 104 and USB function 105 controllers for the selective transfer of files.

In the particular implementation of FIG. 4, the DED controller 98 includes a USB host controller 104 operative to providing USB host interface functionality to the UFD, and a USB function controller 105, operative to provide a file management interface, either as separate entities or as a unified USB controller entity, such as a single USB OnTheGo Integrated Circuit. The DED controller 98 also includes a central controller that controls USB controllers 104, 105 and performs file transfer. The central controller is typically a CPU 106 coupled to Read Only Memory (ROM) 108 holding the control software 114, and could be implemented as a control logic ASIC, as a custom IC or as an embedded controller, or as any other combination capable of the above. The central controller is linked to the memory 107 (typically, including non-volatile flash memory) and may perform read, write and/or erase operations.

The memory 107 is used to store files read from external UFD 101. The DED optionally includes an audio output device, such as a buzzer, and a visual indication, such as a LED, to provide indication/status to the user. In one example, the LED blinks and/or lights up upon coupling between the DED and a UFD and/or upon completion of a file transfer between the DED and a UFD.

In exemplary embodiments, control software 114 that resides on the ROM 108 runs under the CPU and includes instructions for controlling peripherals 104, 105, 107, 109, 112, 113 for the purpose of interacting with the external USB flash drive and transferring files.

The exemplary DED device 12A of FIG. 4 also includes USB power circuits (109) capable of:

a. Providing DC power to an external (guest) UFD.
b. Receiving DC power from PC host via a USB cable with two male plugs, and distributing DC power to system components.
c. Accepting DC power from external source via Power In circuitry 110.

The power source can be either a power supply, an internal battery, or power fed from a connected device through the USB connector. It should be noted that if the DED 12 includes a battery, there is no need for the slave functionality and the ability to be connected to a PC.

Exemplary Operating Routine for DED Operation

Figure 5:
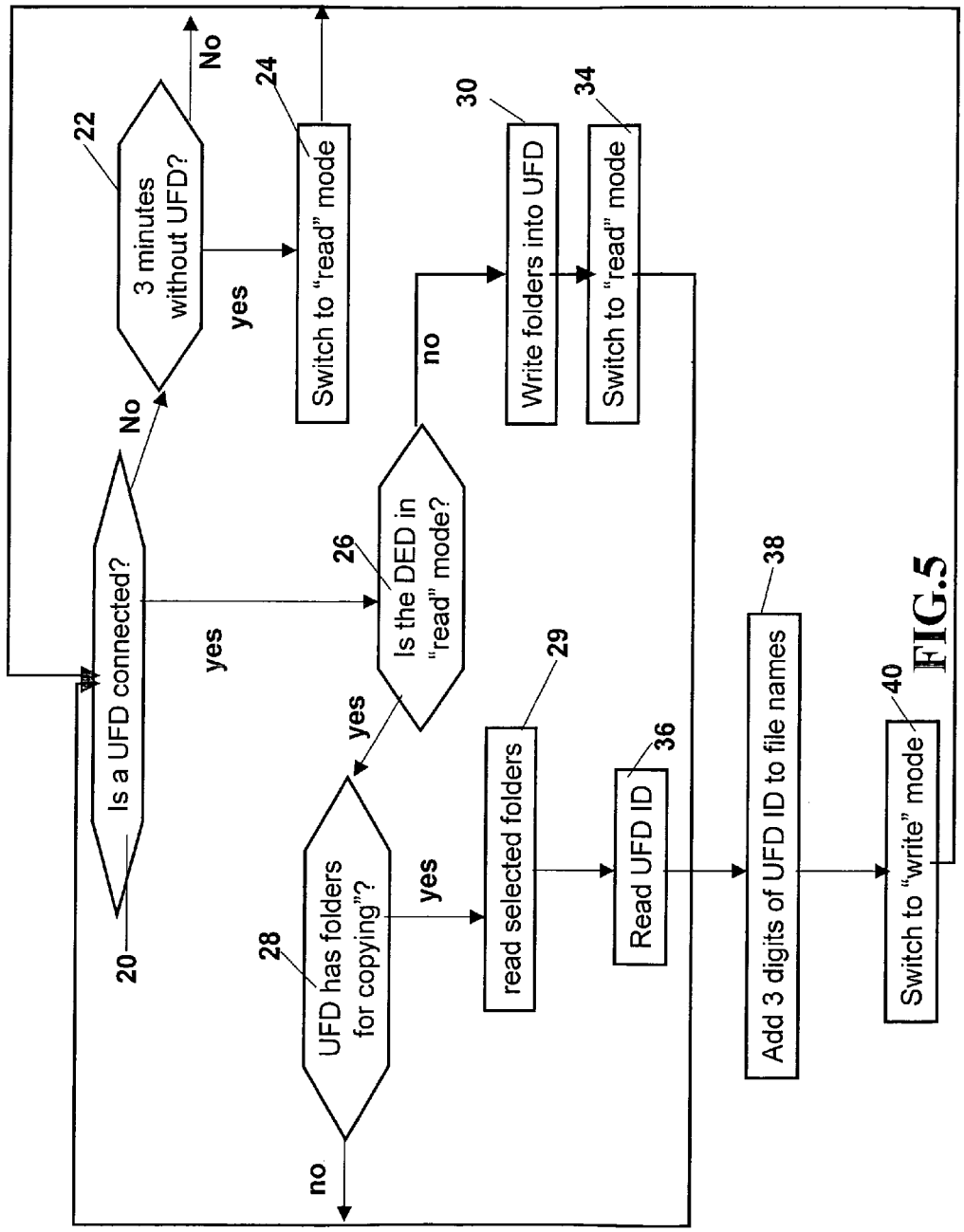

FIG. 5 provides an exemplary operating routine for the DED in accordance with exemplary embodiments providing read mode and write mode. In exemplary embodiments, the DED controller 98 uses routines other than those of the non-limiting examples presented herein.

As used herein, when the DED 12 is in read mode, the DED is configured only to copy and/or move files from the coupled UFD 101 to the DED 12. When the DED 12 is in write mode, the DED is configured only to copy and/or move files from the DED 12 (in particular, the storage memory 107) to the coupled UFD 101.

In exemplary non-limiting embodiments, by default, the DED is in read mode.

Thus, referring once again to FIG. 5, if the DED 12 is connected with a UFD 20, the DED 12 (for example, controller 98) determines 26 if the DED 12 is in read mode or write mode. According to the exemplary embodiment of FIG. 5, if the device is in read mode, the DED controller 98 determines 28 if the UFD has any folder for transfer to the DED 12. If yes, the DED 12 reads (and copies to the storage memory 107) the selected folders (i.e., selected according to the pre-determined convention for what is "targeted" to be copied, for example, marked in the UFD for copy). In some embodiments, the DED 12 also reads the UFD ID 36, and modifies the names of copied and/or moved files (for example, by adding three digits of the UFD ID to file names 38). According to the example of FIG. 5, after finishing copying and/or moving the selected files from the UFD 101 to the DED 12, the DED 12 switches 40 to write mode.

Referring once more to step 26 of FIG. 5, it is noted that if the DED is in fact not in read mode but rather in write mode, one or more folder that reside in the memory 107 of the DED 12 are written into the UFD 101. According to the example of FIG. 5, after finishing copying and/or moving the selected files from the DED 12 to the UFD 101, the DED 12 switches 40 to write mode.

According to the example, after finishing step 40 the device is in write mode and remains in write mode even after the detaching/decoupling of the target UFD 101 from the DED 12. Allowing the device to remain in write mode after the target UFD 101 is detached may be useful, for example, when "distributing" one or more files by sequentially copying the one or more files to a plurality of target UFDs 101, which are sequentially coupled to the DED 101. This allows for the transfer of the selected files from the source UFD to multiple destination UFDs. Nevertheless, in many scenarios, it is only desired to transfer to other UFDs files from the original source UFD and not from any of the destination UFDs. Thus, in exemplary embodiments, the device remains in write mode after writing files to a given UFD, and when the next UFD is coupled to the DED, files are written to this "next UFD" without transferring files from this next UFD to the DED. This process may thus be repeated without transferring files from any of the destination UFDs to the DED, and thus, the device may remain only in write mode when writing files to the different UFDs.

In some embodiments, the DED provides a user control (for example, a button or a user controlled switch or a dial) for explicitly setting the mode to read mode or write mode. Thus, in these embodiments, the mode may be switched by a user engagement of a user control.

Alternatively or additionally, the DED controller 98 is operative to "automatically" switch modes (i.e., without receiving a user command through a user control of the DED). In one example in accordance with FIG. 5, after transferring files to a target UFD and decoupling the target UFD from the DED, the device remains in write mode for a predetermined period of time (for example, three minutes, or any other period of time).

If within this period of time, another UFD is coupled to the DED, the DED will first handle the UFD in write mode. In some embodiments in accordance with FIG. 5, the DED will only handle the UFD in write mode, i.e., if the DED is in write mode when coupling with a particular UFD, the DED will remain in write mode while coupled with that particular UFD. One may, however, "force" the DED 12 to adopt the read mode by leaving the DED 12 uncoupled (for example, uncoupled through a particular port 96, or completely uncoupled) for the pre-determined period of time.

Similarly, it may be assumed, in some embodiments, that if the device sits long enough, a single "session" of copying to one or more UFDs has finished, and at that point, the DED may handle the next copying "session."

In exemplary non-limiting embodiments, when the DED is uncoupled for long enough time to switch modes (for example, from write mode to read mode), one or more files (or all files in the storage memory 107) are automatically erased (for example, by controller 98) without requiring any user command to be received through a user control of the DED 12.

Referring once more to the exemplary implementation described in FIG. 5, it is noted that after a UFD is connected to the DED 12, a determination is made 22 whether the DED 12 has been at least the predetermined amount of time (for example, 3 minutes) without a UFD. In the event that this is true, the controller 98 switches 34 the DED 12 to read mode.

Implementations other than those described in FIG. 5 are contemplated by the present invention.

It is noted that in some embodiments, the DED detects an ID number of a UFD device. Thus, in some embodiments, a decision about whether or not to adopt read mode or write mode may be made in accordance with an ID of a UFD. In one non-limiting example, if a given UFD is decoupled from the DED, and then re-coupled to the DED without a different UFD being coupled to the DED in the interim, the device will automatically adopt the read mode in order to see if there are any new or changed files on the UFD.

In another non-limiting example, the DED may be configured to "recognize" specific UFDs. According to this example, for certain UFDs (recognized according to their identifiers), the DED adopts read mode upon coupling, and for other UFDs the DED adopts write mode upon coupling. Thus, in one example, certain UFDs may be designated as source UFDs by default.

User Controllers on the Device

As used herein, whenever a file selection, file transfer, or modification of a file attribute is performed "automatically," this means that the action is performed in a manner that is insensitive to any user command received through a user control of the DED when the DED is coupled to the UFD. There is no need for such a user command for the "automatically performed" action to occur (i.e., it is usually performed by controller 98 of the DED 12).

Thus, in exemplary embodiments, such as the particular embodiment of FIGS. 1A-1B, the DED 98 features no specific user control, or no specific user control to effect any action related to file management or transfer. For the purposes of this application, a "power-on" switch or button or device is not considered a "user control." A user control is a switch or dial or button or touch-screen or another element in or on the DED 12 (typically, residing in or on the housing of the DED 12) which, when the DED 12 is "on"/has power, influences at least one of: a file transfer between the DED 12 and the UFD 98 and the content of files residing in the DED 12.

Typically, the DED 12 lacks "sophisticated" user controls such as numerical or alpha-numerical keyboard (or parts thereof). This may eliminate the need for the user to learn how to operate such user controls.

In some embodiments, a limited number of "simpler" user controls such as buttons or dials are provided. In one example, the DED has a button or key for one of: switching between read and write mode, or an "erase" control which, when engaged, erase (either explicitly erasing or configuring the DED controller 98 so that the files are treated by the controller 98 as "erased"). This will allow the user to "clean out" or "reset the device" easily and conveniently. In some embodiments, the device 98 thus has a single button or dial.

Some Additional Definitions

As used herein, an "inter-UFD user-selectable file copying device" is a device comprising storage memory for storing data (i.e. volatile and/or non-volatile data), one or more data ports, and a device controller having a file-selection-and-transfer mechanism. The device controller of the "inter-UFD user-selectable file copying device" has a file-selection-andtransfer mechanism that is operative, upon coupling through one of the data ports with a USB flash drive i) to automatically select (i.e. in accordance with file attributes) for transfer a set of files residing in one of the storage memory of the portable exchange device and the USB flash drive; and ii) to effect an inter-device file transfer through one of the data transfer ports with USB flash drive of only the automatically selected files.

The "user selectable" attribute refers to the fact that the file-selection-and-transfer mechanism effects the file selection according to attributes of the files.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise.

The term "such as" is used herein to mean, and is used interchangeably, with the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A portable data exchange device for effecting data transfer operations, the data exchange device comprising:
   a) a storage memory for storing data;
   b) a single data transfer port; and
   c) a device controller having a file-selection-and-transfer mechanism, wherein,
      I) said file-selection-and-transfer mechanism is operative, upon coupling through said port with a USB flash drive which lacks said file-selection-and-transfer mechanism,
         i) to automatically select for transfer a set of files residing in one of said storage memory of the portable data exchange device and said USB flash drive, the set of files being selected based on one or more predefined file attributes including file name, file type/extension, file size, file status and file location in a directory, wherein said automatic selection is not based on any user input; and
         ii) to effect an inter-device file transfer through said data transfer port with said USB flash drive of only said automatically selected files;
      II) the portable data exchange device lacks a video display;
      III) the portable data exchange device lacks any user interface operable by a user to select files for transfer;
      IV) said file-selection-and-transfer mechanism is operative to perform said automatic selecting of said files in accordance with at least one of a file name, file type, file extension, a file location, an identifier of said USB flash drive, a file time stamp, and one of a presence and an absence of files with matching names in both said USB flash drive and said storage memory.

2. The portable data exchange device of claim 1 wherein the device lacks user controls.

3. The portable exchange device of claim 1 further comprising:
   d) a user control that is operative only to effect at least one file operation, wherein the device lacks additional user controls.

4. The portable data exchange device of claim 3 wherein the device has only a single key operative to effect said at least one file operation.

5. The portable data exchange device of claim 3 wherein said user control is operative to erase at least some files residing in said storage memory upon a single user engagement.

6. The portable data exchange device of claim 1 wherein said data transfer port is a female USB port.

7. The portable data exchange device of claim 1 wherein said controller is further operative to automatically modify at least one file attribute of said transferred file.

8. The portable data exchange device of claim 7 wherein said controller is operative to modify said file attribute in accordance with an identifier of said USB flash drive from which the files are copied.

9. The portable data exchange device of claim 1 wherein said controller supports a read mode and a write mode.

10. The portable data exchange device of claim 9 wherein said controller is operative to automatically effect a transition between said modes after an uncoupled time period equal to at least a pre-determined value.

11. The portable data exchange device of claim 10 wherein said controller is operative such that upon coupling with said USB flash drive, the portable data exchange device adopts one of said read mode and said write mode in accordance with an identifier of said USB flash drive.

12. The portable data exchange device of claim 9 wherein said controller is operative to effect a transition between said modes upon detecting a user engagement with a user control.

13. The portable data exchange device of claim 10 wherein said controller is operative to automatically erase data residing in said storage memory after said uncoupled time period.

14. A system for data transfer, the system comprising:
   a) a USB flash drive device; and
   b) the data exchange device of claim 1.

15. A method for transferring files, the method comprising:
   a) using a display-less data exchange device, detecting a coupling between said data exchange device and a first USB flash drive through a USB interface of said data exchange device,
   b) upon said coupling, automatically selecting for transfer a set of files residing in one of said data exchange device and said first USB flash drive, the set of files being selected based on one or more predefined file attributes including file name, file type/extension, file size, file status and file location in a directory, wherein said automatic selection is not based on any user input; and
   c) effecting an inter-device file transfer through said USB interface with said first USB flash drive of only said automatically selected files, wherein steps (b) and (c) are carried out in a manner that is insensitive to any user commands received through a user control of said data exchange device during a time of said coupling;

wherein the portable data exchange device lacks any user interface operable by a user to select files for transfer; and said file-selection-and-transfer mechanism is operative to perform said automatic selecting of said files in accordance with at least one of a file name, file type, file extension, a file location, an identifier of said USB flash drive, a file time stamp, and one of a presence and an absence of files with matching names in both said USB flash drive and said storage memory.

16. The method of claim 15 wherein said data exchange device has only a single data port.

17. The method of claim 15 wherein said inter-device file transfer includes copying only said automatically selected files from said first USB flash drive to said data exchange device, the method further comprising:

d) after said copying to said data exchange device, establishing a write mode within said data exchange device.

18. The method of claim 15 wherein said inter-device file transfer includes copying only said automatically selected files from said first USB flash drive to said data exchange device, the method further comprising:

d) upon detecting a coupling of a different USB flash drive other than said first USB flash drive, copying at least some said previously copied files to said different USB flash drive.

19. The method of claim 18 wherein only files which are absent from said different USB flash drive are copied to said different USB flash drive.

20. The method of claim 15 wherein said inter-device file transfer includes copying only said automatically selected files from said first USB flash drive to said data exchange device, the method further comprising:

d) automatically modifying names of files copied from said first USB flash drive in accordance with an identity of said first USB flash drive and in a manner that is insensitive to any user commands received through a user control of said data exchange device during a time of said coupling.

21. The method of claim 15 wherein said inter-device file transfer includes copying only said automatically selected files from said first USB flash drive to said data exchange device, the method further comprising:

d) after said copying, after a pre-determined uncoupled time period, automatically erasing said copied files.

* * * * *